United States Patent [19]

Takamura et al.

[11] 4,107,403

[45] Aug. 15, 1978

[54] ELECTROCHEMICAL CELL

[75] Inventors: Tsutomu Takamura, Kawasaki; Tamotsu Shirogami, Yamato, both of Japan

[73] Assignee: Tokyo Shibaura Electric Co., Ltd., Tokyo, Japan

[21] Appl. No.: 843,945

[22] Filed: Oct. 20, 1977

[30] Foreign Application Priority Data

Oct. 21, 1976 [JP] Japan .................. 51-125463

[51] Int. Cl.$^2$ ............................................. H01M 2/08
[52] U.S. Cl. ................................................ 429/174
[58] Field of Search ................... 429/174, 184, 185; 361/433

[56] References Cited

U.S. PATENT DOCUMENTS

| 3,294,591 | 12/1966 | Jordan | 429/174 |
| 3,713,896 | 1/1973 | Feldhake | 429/174 |
| 3,945,850 | 3/1976 | Lewis | 429/174 |

FOREIGN PATENT DOCUMENTS 2,315,291 10/1973 Fed. Rep. of Germany .......... 429/185

Primary Examiner—Donald L. Walton
Attorney, Agent, or Firm—Finnegan, Henderson, Farabow & Garrett

[57] ABSTRACT

An electrochemical cell which includes a sealed metallic container at least partially composed of an anode metal member and a cathode metal member, said container containing a power generating material. At each edge portion of the metal members is covered by a seal material including a coating layer of thermoplastic resin containing a functional group with hydrogen bonding capability. Sealing of the metallic container is achieved by heat-pressure bonding the seal members formed on the respective metal members with each other or these seal members with similar seal members formed on another metal member forming the metallic container.

14 Claims, 5 Drawing Figures

ELECTROCHEMICAL CELL

BACKGROUND OF THE INVENTION

1. Field of the Invention

This invention relates to a sealed-type electrochemical cell, and more specifically to a sealed-type electrochemical cell sealed by heat-pressure bonding seal materials including some kind of thermoplastic resin layer.

2. Description of the Prior Art

In the prior art sealed-type cells, an opening of a metallic container containing a power generating material and serving also as a cathode terminal is fitted with and sealed by a metallic cover serving also as an anode terminal through an insulating packing. In the cells of such configuration, sealing could not fully be achieved due to uneven packing thickness of existence of electrolyte and/or dust particles sticking to the portion to be sealed, causing the electrolyte to leak through a space between the insulating packing and the metallic container and thereby damaging the machines or apparatus used with these cells.

U.S. Pat. No. 3,713,896, issued to Feldhake on Jan. 30, 1973, discloses a cell in which metallic parts thereof is sealed with epoxy-polyamide resin. From a point of view of sealing efficiency as well as operating capability, however, there still remains room for improvement.

SUMMARY OF THE INVENTION

An object of this invention is to provide an electrochemical cell relatively easy to manufacture and high in sealing efficiency.

According to this invention, there is provided an electrochemical cell comprising a sealed metallic container at least partially composed of an anode metal member and a cathode metal member with their respective edge portions; a power generating material contained in the metallic container; and insulating seal members formed over the respective edge portions, the insulating seal members including coating layers of thermoplastic resin containing a functional group with hydrogen bonding capability, the coating layer being formed on the respective edge portions, sealing of the metallic container being achieved by heat-pressure bonding the seal members.

According to a first embodiment of the invention, the sealed container is wholly composed of the anode metal member and the cathode metal member, and the seal members formed over the respective edge portions of these metal members are heat-pressure bonded with each other.

In a second embodiment, the sealed container is composed of the metal member forming a bottom, the metal member forming a cover, and a third metal member forming a side wall and having over both edge portions thereof seal members similar to those over said metal members, and the seal member formed on the anode member and one seal member formed on the third metal member, as well as the seal member formed on the cathode metal member and the other seal member formed on the third metal member, are heat-pressure bonded with each other.

DETAILED DESCRIPTION OF THE PREFERRED EMBODIMENTS

The insulating seal members used in this invention include coating layers of thermoplastic resin covering or formed directly on the metal members composing the sealed metallic container, and the thermoplastic resin contains a functional group having hydrogen bonding capability as described hereinbefore. In general, metals have natural oxides formed over the surface thereof, and it is believed that the functional group contained in the resin is bonded with the oxygen in such oxides by hydrogen bond, thereby sticking the resin fast to the metal members. The thermoplastic resin may include some thermosetting resin within such a degree as to keep the thermoplasticity of the resin obtained.

Typical examples of the above-mentioned thermoplastic resin include Nylons such as 6-Nylon, 6,6-Nylon, 11-Nylon, 12-Nylon, aromatic Nylon, and blend of 6-Nylon, with 12-Nylon; blends or co-polymer of Nylon and other resins, such as Nylon and phenoxy resin, 12-Nylon and epoxy resin, Nylon and polysulfone resin, Nylon and acrylic resin, Nylon and polyimide resin, Nylon and polycarbonate, and Nylon and polyurethane; polysulfone and mixtures of polysulfone and the aforesaid blends; phenoxy resin and mixtures of phenoxy resin and the aforesaid blends; acrylic resin and mixtures of acrylic resin and the aforesaid blends; and Noryl resin. Preferred are Nylons, especially 12-Nylon.

In order to improve the adhesion between the metal member and the thermoplastic resin, preferably the metal member is immersed in, for example, acetone and the like to degrease, pickled in a diluted acid solution, washed with water and dried to clean the surfaces thereof.

Sealing may be achieved by heat-fusing the layers of thermoplastic resin formed on the respective metal members with each other under pressure.

In a preferred embodiment of this invention, a layer or layers of thermosetting resin are interposed between the layers of thermoplastic resin and these layers are heat-pressure bonded with each other. Typical examples of such thermosetting resin include phenol resin, epoxy resin, and unsaturated polyester resin.

Thus, the formation of the layer or layers of thermosetting resin will not only improve the adhesion between the seal members but facilitate sealing operations. The reason is that the thermosetting resin will be solidified by chemical cross-linkage, thus requiring no prolonged continuation of pressurization.

Embodiments of this invention will be described with reference to the accompanying drawings. In all the drawings, identical numerals denote the same parts or portions.

Figure 1:
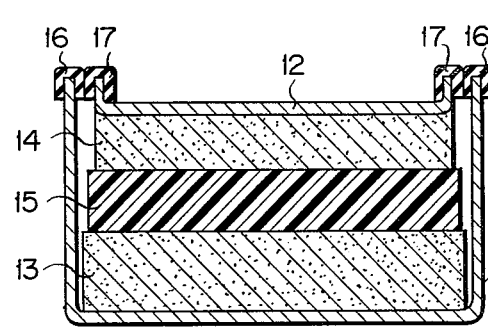
FIGS. 1 to 5 are sectional views each showing an embodiment according to the invention.

Referring now to FIG. 1, an electrochemical cell 10 of this invention is composed of a metal member 11 forming a container body and serving as a cathode terminal, and a metal member 12 forming a cover of the container body 11 and serving as an anode terminal. These metal members may be formed by suitably pressing or drawing a nickel-plated steel plate, galvanized steel plate, copper-plated steel plate, tinned steel plate, cadmium-plated steel plate, zinc-iron-clad plate, nickel-iron-clad plate, or copper-iron-clad plate.

The metallic container 11 contains a power generating material comprised of a cathode mix 13 laid in contact with the container 11, an anode mix 14 laid in contact with the metallic cover 12, and an electrolyte-impregnated base material 15 interposed between these mixes 13 and 14. The cathode mix 13 may, for example, be obtained by mixing and pressing to a disk one or more kinds of composites, including silver oxide, silver dioxide, mercury oxide, manganese dioxide, lead dioxide, nickel oxide, and oxyhydroxy nickel (III), with a suitable conducting material as occasion demands. The electrolyte-containing material 15 is composed of a woven or nonwoven fabric consisting of one or more kinds of materials including cellulose, polyamide, polypropylene, and polyvinyl chloride, impregnated with one or more kinds of electrolytes such as zinc chloride, ammonium chloride, sulfuric acid, potassium hydroxide, and sodium hydroxide. Further, the anode mix 14 may be formed by metallic plates, pressed powder or powder mainly including zinc or cadmium with an electrolyte or gel-forming materials.

As shown in the drawings, a seal member 16 composed of a coating layer of thermoplastic resin of the invention is formed over the peripheral edge portion of the opening of the metallic container body 11 so as to cover the edge portion from both sides thereof by molding or dipping method.

The edge portion of the metallic cover 12 is bent upward to face the side wall of the metallic container body. Likewise, an insulating seal member 17 composed of a coating layer of thermoplastic resin of the invention is formed over the edge portion so as to cover it from both sides thereof.

These seal members 16 and 17 are heat-fused with each other under pressure for a short time by means of infrared rays, ultrasonic waves or microwaves, thereby sealing the cell 10.

Figure 2:
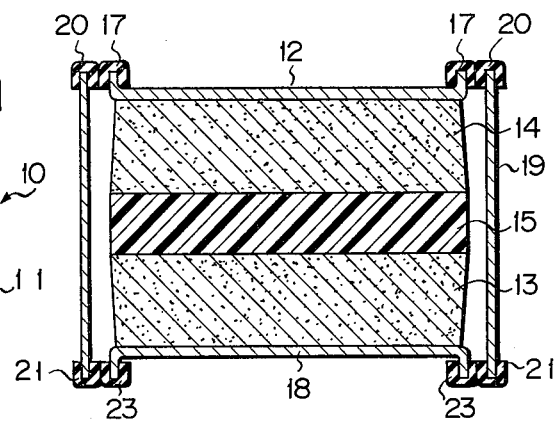

Referring now to FIG. 2, the container body is composed of a metal member 18 with the same shape as that of the cover 12 forming the bottom of the container body and serving as a cathode terminal and a cylindrical metal member 19 forming the side wall of the container body. Thermoplastic resin layers 20 and 21 of the invention are formed over both peripheral edge faces of the cylindrical side wall 19 respectively, and the resin layers 20 and 17, as well as the resin layer 21 and a similar resin layer 23 formed over the edge portion of the metal member 18, are heat-fused with each other.

Figure 3:
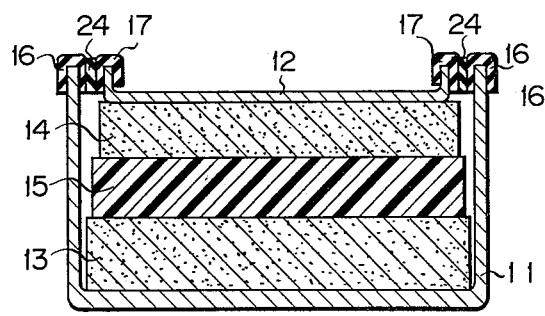

In FIG. 3, showing a cell with the same configuration as that shown in FIG. 1, the thermoplastic resin layers 16 and 17 are heat-pressure bonded through a thermosetting resin layer 24, thus the sealing of the cell being accomplished.

Figure 4:
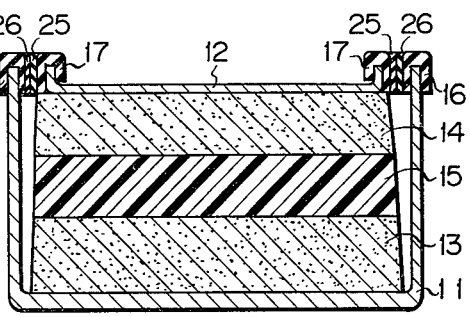

In FIG. 4, also showing a cell with the same configuration as that shown in FIG. 1, the thermoplastic resin layers 16 and 17 are heat-pressure bonded through two thermosetting resin layers 25 and 26.

Figure 5:
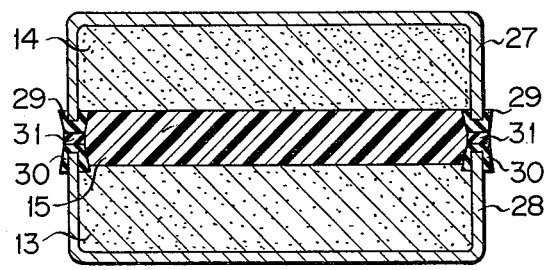

In FIG. 5 a metal member 27 serving as a cathode terminal and a metal member 28 serving as an anode member are symmetrical, and thermoplastic resin layers 29 and 30 formed at the respective edge portions of the members are heat-fused with each other through a thermosetting resin layer 31.

EXAMPLE 1

In this example there was prepared the similar cell to that shown in FIG. 1.

The peripheral edge portion of the container body 11 composed of a nickel-plated steel plate was washed and degreased with trichloroethylene, pickled in a diluted acid solution, washed with water and dried.

Subsequently, the peripheral edge portion was heated to a temperature of 300° C, and fine powder of 12-Nylon (particle size: 50 to 150μ) was sprinkled over the heated edge portion to form the resin layer 16 with a thickness of 0.05 to 0.2mm. Meanwhile, over the peripheral edge portion of the cover 12 obtained by working a zinc-iron-clad plate was also formed the 12-Nylon layer 17 with the same thickness in the same manner.

Thereafter, the prescribed power generating material was contained in the container body 11, the cover 12 was set properly, and the adjacent Nylon resin layers 16 and 17 were heat-pressure bonded at a temperature of 200° C to 250° C for 3 to 10 seconds by ultrasonic heating. Thus, there was obtained the desired cell.

EXAMPLE 2

There was obtained a cell with the same configuration as that shown in FIG. 3 in the same manner as in Example 1, provided that a 20% methyl ketone solution of an equivalent mixture of novolac-type phenol resin and bisphenol-type epoxy resin (Epikote 1004 available from Shell Co.) was applied on to the 12-Nylon layers 16 and 17 and dried to form thermosetting resin layers with a thickness of 5 to 50μ.

EXAMPLE 3

There was obtained a cell with the same configuration as that shown in FIG. 4 in the same manner as in Example 1, provided that the phenol resin layer 26 and the epoxy resin layer 25 were formed on the 12-Nylon layers 16 and 17 respectively.

EXAMPLE 4

In this example there was prepared a cell with the same configuration as that shown in FIG. 5.

The 12-Nylon layers 29 and 30 were formed over the peripheral edge portions of the metal members 27 and 28 respectively in the same manner as in Example 1. A mixture of 1 part by weight of resol-type phenol resin, obtained from phenol and formalin, and 9 parts by weight of Epikote 1004 was applied on to the resin layers 29 and 30 and dried to form thermosetting resin layers. Thereafter, the prescribed generation element was placed in, and then the resin layers were heat-pressure bonded with each other at a temperature of 200° C to 300° C. Thus, there was obtained the desired cell.

The electrochemical cell of this invention, with such configuration as described above, is high in sealing efficiency and capable of entirely preventing leakage of electrolyte. Further, the seal members are previously applied to the metal members, so that the members may be stored as they are, providing a substantial advantage in the manufacturing process.

What we claim is:

1. An electrochemical cell comprising a sealed metallic container at least partially composed of an anode metal member and a cathode metal member with their respective edge portions; a power generating material contained in said metallic container; and insulating seal members formed over said respective edge portions, said insulating seal members including coating layers of thermoplastic resin containing a functional group with hydrogen bonding capability and formed on said respective edge portions of the metal members, sealing of said metallic container being achieved by heat-pressure bonding said seal members.

2. An electrochemical cell according to claim 1, wherein said seal members further includes a layer or layers of thermosetting resin formed on said coating layers of thermoplastic resin.

3. An electrochemical cell according to claim 1, wherein said cathode metal member forms a body of said sealed metallic container and said anode metal member forms a cover to close said container body, sealing of said metallic container being achieved by heat-pressure bonding said seal members formed over the respective edge portions of said anode and cathode metal members with each other.

4. An electrochemical cell according to claim 3, wherein said thermoplastic resin is Nylon.

5. An electrochemical cell according to claim 4, wherein said thermoplastic resin is 12-Nylon.

6. An electrochemical cell according to claim 3, wherein said seal members further includes a layer or layers of thermosetting resin formed on said coating layers of thermoplastic resin.

7. An electrochemical cell according to claim 6, wherein said thermosetting resin is a mixture of phenol resin and epoxy resin.

8. An electrochemical cell according to claim 6, wherein said layer of thermosetting resin is a laminate composed of a phenol resin layer and an epoxy resin layer.

9. An electrochemical cell according to claim 1, wherein said sealed metallic container comprises a bottom composed of said cathode metal member, a side wall composed of a third metal member with said seal members formed over both edge portions thereof, and a cover composed of said anode metal member; sealing of said metallic container being achieved by heat-pressure bonding said seal member formed over the edge portion of said anode metal member and said seal member formed over one edge portion of said third metal member, as well as said seal member formed over the edge portion of said cathode metal member and said seal member formed over the other edge portion of said third metal member, with each other.

10. An electrochemical cell according to claim 9, wherein said thermoplastic resin is Nylon.

11. An electrochemical cell according to claim 10, wherein said thermoplastic resin is 12-Nylon.

12. An electrochemical cell according to claim 9, wherein said seal members further includes a layer or layers of thermosetting resin formed on said coating layers of thermoplastic resin.

13. An electrochemical cell according to claim 12, wherein said thermosetting resin is a mixture of phenol resin and epoxy resin.

14. An electrochemical cell according to claim 12, wherein said layer of thermosetting resin is a laminate composed of a phenol resin layer and an epoxy resin layer.

* * * * *